(12) United States Patent (10) Patent No.: US 8,339,996 B2
Wijnands et al. (45) Date of Patent: Dec. 25, 2012

(54) PIM SPARSE-MODE EMULATION OVER MPLS LSP'S

(75) Inventors: Ijsbrand Wijnands, Leuven (BE); Arjen Boers, Sitges (ES)

(73) Assignee: Cisco Technology, Inc., San Jose, CA (US)

( * ) Notice: Subject to any disclaimer, the term of this patent is extended or adjusted under 35 U.S.C. 154(b) by 1475 days.

(21) Appl. No.: 11/253,371

(22) Filed: Oct. 19, 2005

(65) Prior Publication Data
US 2006/0221958 A1 Oct. 5, 2006

Related U.S. Application Data

(60) Provisional application No. 60/668,320, filed on Apr. 5, 2005.

(51) Int. Cl.
*H04L 12/28* (2006.01)
(52) U.S. Cl. ........................ 370/256; 370/389
(58) Field of Classification Search .................. 370/390, 370/342, 389, 400, 401
See application file for complete search history.

(56) References Cited

U.S. PATENT DOCUMENTS

| | | | | |
|---|---|---|---|---|
| 6,510,144 B1* | 1/2003 | Dommety et al. | | 370/328 |
| 7,522,600 B1* | 4/2009 | Aggarwal et al. | | 370/390 |
| 2003/0063613 A1* | 4/2003 | Carpini et al. | | 370/401 |
| 2003/0193958 A1* | 10/2003 | Narayanan | | 370/400 |
| 2004/0132448 A1* | 7/2004 | Torres et al. | | 455/427 |
| 2005/0157741 A1* | 7/2005 | Wu et al. | | 370/432 |
| 2005/0169266 A1* | 8/2005 | Aggarwal et al. | | 370/389 |
| 2005/0180448 A1* | 8/2005 | Kobayashi | | 370/432 |
| 2006/0007931 A1* | 1/2006 | Wright et al. | | 370/392 |
| 2006/0088031 A1* | 4/2006 | Nalawade | | 370/390 |
| 2006/0221958 A1* | 10/2006 | Wijnands et al. | | 370/389 |
| 2009/0161675 A1* | 6/2009 | Aggarwal et al. | | 370/390 |

OTHER PUBLICATIONS

Aggarwal et al., Network Working Group- Internet Dreaft, "IP Multicast with PIM-SM over a MPLS Traffic Enginneered Core", (Expiration Date Mar. 2004, draft-raggarwa-pim-sm-mpls-te-00.txt) Sep. 2003, pp. 1-11.*

Cho et al., "A simplemethod for implementins PIM to ATM based MPLS networks"; Nine IEEE International Conference on Oct. 10-12, 2001; pp. 362-365.*

Steven Deering et al., Network Working group-Internet Draft, "Protocol Independent Multicast Version 2, Dense Mode Specification", May 21, 1997, pp. 1-12.*

T. Pusateri, Internet Draft, "Distance Vector Multicast Routing Protocol Applicability Statement", May 21, 2004, pp. 1-7.*

* cited by examiner

*Primary Examiner* — Mark Rinehart
*Assistant Examiner* — Matthew Hopkins
(74) *Attorney, Agent, or Firm* — Cambell Stephenson LLP

(57) ABSTRACT

An apparatus and method for emulating a shared or source distribution tree within an MPLS network. In one embodiment of the method, a router receives a multicast data packet. The router transmits the multicast data packet to a first router via a first point-to-point label switched path (LSP). The router replicates the multicast data packet to produce a replicated multicast data packet. Then the router transmits the replicated multicast data packet to a second router via a second point-to-point LSP. The first point-to-point LSP is distinct from the second point-to-point LSP.

14 Claims, 2 Drawing Sheets

PIM SPARSE-MODE EMULATION OVER MPLS LSP'S

CROSS-REFERENCE TO RELATED APPLICATIONS

The present patent application claims priority to U.S. Patent Application No. 60/668,320, filed on Apr. 5, 2005, entitled "Multipoint Labeling" having inventors Ijsbrand Wijnands, Arjen Boers, and Toerless Eckert, and is incorporated by reference herein in its entirety and for all purposes.

BACKGROUND OF THE INVENTION

Multicast communication enables simultaneous transmission of data packets between a source and select receivers (i.e., those receivers belonging to a multicast group) via a packet-switched network. Multicast data packets are forwarded to receivers through a multicast distribution tree that consists of number of network nodes. For purposes of explanation only, the term node will mean a router or a device that functions as a router, it being understood that the term node should not be limited thereto. Routers of the tree are responsible for replicating data packets at each bifurcation point (the point of the tree where branches fork). This means that only one copy of the data packets travel over any particular link in the network, making multicast distribution trees extremely efficient for distributing the same information to many receivers.

There are several different multicast protocol standards that enable multicast communication, including but not limited to Protocol Independent Multicast (PIM)—Sparse Mode (SM), which is described in Internet Engineering Task Force Request for Comments 2362 entitled "Protocol Independent Multicast-Sparse Mode: Protocol Specification," published in June 1998, and hereby incorporated by reference in its entirety. Subsequent revisions of this specification are also incorporated herein by reference in their entirety. In PIM-SM, multicast data packets are received from one or more sources via a rendezvous point (RP). The RP then forwards the data packets to receivers via a shared distribution tree. In a sense, RPs act like meeting places for sources and receivers as will be more fully described below. Routers typically function as RPs for multicast communication, and the present invention will be described with reference to routers acting as RPs it being understood that the present invention should not be limited thereto.

PIM-SM enabled networks create shared distribution trees through which multicast data packets initially travel to new receivers of a multicast group. When creating a shared distribution tree or branch thereof, PIM-SM enabled routers (other than the RP router) initially may not know the IP address of the source or sources transmitting data. However, the routers should know the IP address of the RP router. Consider the exemplary enabled network 10 shown within FIG. 1 in which hosts (e.g., server computer systems) 12 and 14 are coupled to hosts (e.g., desktop computer systems) R1 and R2 via a network of PIM-SM enabled routers 20-36. Presume only host 14 transmits multicast data packets to receivers of a multicast group designated by the IP address G1. For purposes of explanation, PIM-SM enabled router 24 is designated as the RP for multicast group G1. Suppose host R1 seeks to join multicast group G1 as a receiver, but there is no shared distribution tree branch in existence between RP router 24 and host R1's uplink router 34 through which multicast data packets can travel to reach host R1. Host R1 can initiate a shared distribution tree branch building process by first sending an Internet Group Management Protocol (IGMP) membership report that contains G1, to uplink router 34.

Uplink router 34 receives the IGMP report, and in response router 34 creates and stores in memory an output interface list (OIL) for G1, presuming one does not already exist in router 34. As will be more described below, PIM enabled routers forward multicast data packets based on interfaces identified in OILs. Router 34 adds interface 2, the interface that received the IGMP membership report from host R1, to the OIL created for G1 so that router 34 knows to forward multicast data packets it subsequently receives to receiver R1. The uplink router 34 also performs a reverse path forwarding (RPF) check using a routing table (not shown) and the known IP address (or prefix thereof) of RP router 24. RPF checks are used in identifying the next hop PIM enabled router or the next PIM enabled router that is topologically closest to the RP. In the illustrated example, router 30 is the next hop PIM enabled router towards RP router 24. Router 34 then sends a (*, G1) Join control packet out its RPF interface to router 30 coupled thereto. The "*" is a wildcard used in PIM-SM to identify any source that is transmitting multicast data packets to receivers of the multicast group G1.

Router 30 receives the (*, G1) Join control packet and responds in similar fashion. More particularly, router 30 creates an OIL for G1, presuming one does not already exist. Interface 2, the interface of router 30 that received the (*, G1) Join control packet, is added to router 30's OIL for G1. Router 30 then performs an RPF check using the IP address of RP router 24, which in turn identifies router 26 as the next hop PIM enabled router towards the RP. Router 30 then sends a (*, G1) Join control packet out its RPF interface to upstream router 26 coupled thereto.

In general this shared distribution tree branch building process continues with upstream router towards the RP router until either a (*, G1) Join control packet reaches the RP or reaches an upstream router that has a pre-existing OIL for G1. For purposes of explanation, it will be presumed that router 26 has an existing OIL for G1. This OIL may list several interfaces (not shown) of router 26, except interface 2. As such, interface 2, the interface of router 26 that received the (*, G1) Join control packet from router 30, is added to router 26's OIL for G1. Adding interface 2 to router 26's OIL for G1 completes the construction of the shared distribution tree branch between RP router 24 and uplink router 34. Thereafter, multicast data packets can flow from the RP router 24 to host R1 via the shared distribution tree branch that includes routers 26, 30, and 34 as will be more fully described below.

Host R2 can also join multicast group G1 as a receiver in a similar fashion. More particularly, host R2 can join by first sending an IGMP membership report to uplink router 36. Uplink router 36 receives the IGMP report, and in response router 36 creates and stores in memory an OIL for G1, presuming one does not already exist. Router 36 adds interface 3, the interface that received the IGMP membership report from host R2, to the OIL it creates for G1. The uplink router 36 also performs an RPF check using the known IP address of the RP router 24. In the illustrated example, router 30 is identified as the next hop PIM enabled router towards the RP. Router 36 then sends a (*, G1) Join control packet out its RPF interface to upstream router 30 coupled thereto.

Router 30 receives the (*, G1) Join control packet from router 36 via interface 3. Router 30, however, has an existing OIL for G1 as a result of the shared distribution tree branch building process described above. Interface 3, the interface of router 30 that received the (*, G1) Join control packet from router 36, is added to the OIL for G1. Accordingly, router 30's OIL for multicast group G1 will have at least two interfaces (i.e., interfaces 2 and 3). Adding interface 3 to RP router 30's OIL for G1 completes the construction of the shared distribution tree branch between router 30 and uplink router 36 since router 30 had a forwarding state (i.e., an OIL) for multicast group G1 when it received the (*, G1) Join control packet. Thereafter, multicast data packets can flow from the RP router 24 to host R1 via the shared distribution tree branch that includes routers 30 and 36 as will be more fully described below.

Source S2 transmits multicast data packets to RP router 24 for subsequent distribution to receivers R1 and R2 via the shared distribution tree. Each multicast data packet from source 14 will include G1 and S2, where S2 is the IP address of source 14. When a router including the RP router on a shared distribution tree receives a multicast data packet, the router decides which way to send it based on the router's OIL for the group destination IP address contained in the multicast packet. It is noted that a downstream router may decide which way to send the multicast packet based on other information of the packet, such as the packet's source IP address. However, since FIG. 1 is being described with reference to only source 14 transmitting multicast data packets to receivers of group G1, the routers need only use G1 to decide which way to forward multicast data packets.

Router 24 accesses its OIL for multicast group G1 in response to receiving the multicast packets from source 14. The OIL lists interface 3 as at least one output for the received multicast data packets. Accordingly, RP router 24 transmits the multicast data packets it receives, or replications thereof, from source S2 out of interface 3 to router 26. Router 26 also forwards the multicast data packets it receives, or replications thereof, from RP router 24 out of interface 2, the interface identified in the OIL for multicast group G1, to router 30. Router 30 receives the multicast packets from router 26 and accesses its OIL for G1, the destination address of the multicast data packets. When an OIL identifies more than one output interface through which multicast data packets are to be forwarded, the router replicates the multicast data packets it receives accordingly. The OIL of router 30 lists at least two output interfaces, and accordingly, router forwards replications of multicast data packets from router 26 to routers 34 and 36, respectively, via interfaces 2 and 3, respectively. For purposes of explanation, it will be presumed that router 30's OIL for G1 includes more than one interface. Lastly, routers 34 and 36 forward the multicast packets they receive from router 30 to receivers R1 and R2, respectively.

Shared distribution trees may not be the fastest or most efficient data communication path for transmitting multicast data packets from sources to receivers. After a receiver begins receiving multicast data packets from a source via the shared distribution tree as described above, the receiver's uplink router may trigger a routine to create or join a faster and/or more efficient source distribution tree. Source distribution trees, like shared distribution trees, transmit multicast packets from a source to receivers of a multicast group. Source distribution trees, however, generally avoid transmission through RPs. Packet travel time through shared distribution trees are usually higher when compared to the packet travel time through shared distribution trees since, in general, source distribution trees employ fewer routers in the communication paths between the source and receivers.

The process of creating a source distribution tree or branch thereof is similar to the process described above for creating a shared distribution tree or branch thereof. One difference, however, is that the uplink router that triggers the source tree creation initially will know the IP address of the source of interest since the uplink router has received multicast data packets containing the IP address (e.g., S2) of the source. To illustrate, suppose router 36 seeks to join a source distribution tree rooted at source 14 after router 36 receives multicast data packets from source 14 via the shared distribution tree. Router 36 creates an OIL for (S2, G2), wherein S2 is the IP address of source 14. The interface (e.g., interface 3) coupled to receiver R2 is added to the OIL for (S2, G2). Router 36 then performs an RPF check using S2 in order to identify the next hop PIM enabled router closest to source 14. In the illustrated example, router 32 as the next hop PIM enabled router towards source 14. The uplink routers router then sends a (S2, G2). Join control packet out the RPF interface to upstream router 32.

Router 32 receives the (S2, G2) Join control packet and creates an OIL for (S2, G2), assuming one does not previously exist. Interface 2, the interface of router 32 that received the (S2, G2) Join control packet, is added to router 32's OIL for (S2, G2). Router 32 then performs an RPF check using S2, the IP address of source 14. The RPF check identifies router 28 as the next hop PIM enabled router towards source 14. Router 32 then sends a (S2, G2) Join control packet out its RPF interface to upstream router 28 coupled thereto.

The source distribution tree branch building process is similar to the shared distribution tree branch building process in that the source distribution tree branch building process continues with each upstream router until either the (S2, G2) Join control packet reaches the root router (e.g., router 22) or an upstream router that has a pre-existing OIL for (S2, G2). For purposes of explanation, it will be presumed that router 28 has an existing OIL for (S2, G2). This OIL may list several interfaces (not shown), except interface 2. As such, interface 2, the interface of router 28 that received the (S2, G2) Join control packet from router 32, is added to router 28's OIL for (S2, G2). Adding interface 2 to router 28's OIL for (S2, G2) completes the construction of the source distribution tree branch between root router 222 and uplink router 36. Thereafter, multicast data packets can flow from source 14 to host R2 via the source distribution tree branch that includes routers 22, 28, 32 and 36.

After creation of the source distribution tree branch described above, the uplink router 36 may receive copies of data from source 14 via both the shared and source distribution trees. To avoid receiving and processing duplicate data, router 36 can send a Prune control packet to router 30 of the shared distribution tree. The Prune control packet instructs router 30 to prune off or remove the branch of the shared distribution tree for multicast group G1 that forwards multicast data packets from source S2 to router 36. This can be done by removing interface 3 from router 30's OIL for G1. Once the Prune control packet is implemented at router 30, router 36 will only receive multicast data packets from source 14 via the source distribution tree.

Packet-switched networks employing PIM-SM are widely used, but other technologies also exist for transmitting data from sources to receivers. Multiprotocol Label Switching (MPLS) is another network technology for transmitting data packets from sources to receivers. In operation, packets incoming to an MPLS network are assigned a label by an ingress label switch router (LSR). Labeled packets are forwarded along a label switch path (LSP) where each LSR makes packet forwarding decisions based solely on the contents of the label. LSPs come in several forms: point-to-point (P2P) LSPs in which labeled packets are transmitted from one ingress LSR to one egress LSR; point-to-multipoint (P2MP) LSPs in which labeled packets are transmitted from one ingress LSR to multiple egress LSRs, and; multipoint-to-multipoint (M2MP) LSPs which couple multiple ingress LSRs to multiple egress LSRs. U.S. patent application Ser. No. 11/204,837, entitled "Building Multipoint to Multipoint Label Switch Pass," filed on Aug. 16, 2005, is incorporated herein by reference in its entirety and describes one method for building P2MP or MP2MP LSPs within an MPLS enabled network.

LSRs along an LSP use label look-up tables that link incoming packet labels to outgoing packet labels and outgoing interfaces. Each LSR strips off the incoming packet label and applies an outgoing packet label which tells the next LSR in the LSP how to forward the data packet. After stripping off the incoming packet label, branching LSRs in P2MP and MP2MP LSPs replicate packets as needed and forward the original and replicated packets to the next LSR in the LSP with the same outgoing packet label attached or added thereto. MPLS allows LSRs to make simple forwarding decisions based on the contents of a simple label, rather than making a complex forwarding decision based on an IP address (e.g., a multicast group IP address).

Labels are short, fixed length, locally significant identifiers which are used to identify a Forwarding Equivalence Class (FEC). An FEC represents packets that share the same requirement for transport, e.g., over the same path with the same forwarding treatment. Typically packets belonging to the same FEC (e.g., multicast data packets with the same source and group IP addresses S and G, respectively) will follow the same LSP through the MPLS network. While assigning a packet to an FEC, the ingress LSR may look at the IP header and also some other information such as the interface on which the packet arrived.

LSPs are provisioned using Label Distribution Protocols (LDPs) such as RSVP-TE or (M)LDP. Either of these protocols is used to establish an LSP through an MPLS network and will reserve necessary resources to meet pre-defined service requirements for the LSP. LDP lets an LSR distribute labels to its LDP peers. When an LSR assigns a label to an FEC it informs its relevant peers of this label and its meaning, and LDP is used for this purpose. Since a set of labels from an ingress LSR to an egress LSR in an MPLS network defines an LSP, LDP helps in establishing a LSP by using a set of procedures to distribute the labels among the LSR peers.

Oftentimes, multicast data packets must travel through routers that are PIM-SM enabled and routers that are MPLS enabled. Source and shared distribution trees can be formed only through those routers that are PIM enabled. While edge (i.e., ingress and egress) routers of an MPLS network may be PIM enabled, core routers are not PIM enabled. Thus, source or shared distribution trees cannot be formed through MPLS networks. However, P2MP LSPs within a MPLS network can be used to "connect" multicast group receivers on one side of an MPLS network to a source or a shared distribution tree on the other side of the MPLS network, so that multicast packets transmitted on the source or shared distribution tree can reach the receivers notwithstanding a distribution tree branch interruption caused by the MPLS network. In other words, a P2MP LSP can be used in an MPLS network to emulate a source or shared distribution tree within an MPLS network.

To illustrate, FIG. 2 shows the network 10 of FIG. 1 with PIM-SM enabled routers 26-36 replaced with MPLS enabled routers 40-52, respectively. Collectively, MPLS enabled routers 40-52 form an MPLS network 54. In addition to being MPLS enabled, routers 40, 42, 50 and 42 are PIM-SM enabled. Routers 40, 42, 50 and 42 are edge routers (e.g., ingress or egress routers), while routers 44 and 46 are core routers. Routers 44 and 46 are considered core routers since they are only capable of communicating with the egress routers 40, 42, 50 and 52 using MPLS protocols. Edge routers 40, 42, 50 and 42 can communicate with each other using, for example PIM control packets transmitted to each other vis-à-vis LSPs through core routers 44 or 46, and edge routers 40 and 42 can communicate with PIM enabled routers 22 and 24 using PIM procedures described above.

Receivers R1 and R2 can receive (S2, G1) multicast data packets via RP router 24 and a P2MP LSP consisting of routers 40, 44, 50, and 52. More particularly, ingress router 40 receives a (S2, G1) multicast data packet from RP router 24. Ingress router 40 identifies the FEC corresponding to (S2, G1) of the incoming multicast data packet from RP router 24. The FEC is then used to identify the outgoing packet label and outgoing interface (i.e., interface 2) of ingress router 40 for forwarding a labeled packet along the P2MP LSP. The outgoing packet label is attached or added to the incoming multicast data packet, and the outgoing label packet sent to core router 44, the next router of the P2MP LSP, via interface 2. Core router 44, in turn, strips off the incoming packet label from the labeled packet received from ingress router 40, and core router 44 uses the incoming packet label to look up the outgoing packet label and the outgoing interfaces. Core router 44 attaches or adds the outgoing packet label to the multicast data packet. Core router 44 replicates the outgoing labeled packet since the P2MP LSP branches out at core router 44, and the outgoing labeled packets are sent out interfaces 2 and 3 to egress routers 50 and 52, respectively, of the P2MP LSP. Egress routers 50 and 52 receive respective incoming labeled packets from core router 44. Egress routers 50 and 52 strip off the labels. As noted above, egress routers 50 and 52 are also PIM-SM enabled. As such, egress routers 50 and 54 use the multicast group address G1 contained in the multicast packets and their respective OILs for G1 to forward the multicast data packets to receivers R1 and R2, respectively.

Like the PIM-SM enabled network 10 in FIG. 1, transmission of multicast data packets from host 14 to, for example, receiver R2 in FIG. 2 is more efficiently handled by avoiding the RP router 24. Since egress router 52 is PIM-SM enabled, egress router 52 may trigger a routine to create or join a faster and/or more efficient source distribution tree after egress router 52 begins receiving (S2, G1) multicast data packets via the P2MP LSP. A source distribution tree cannot be established through MPLS network 54, but an LSP through MPLS network 54 can be used to connect egress router 52 to the source distribution tree rooted at router 22. For example, egress router 52 can receive (S2, G2) multicast data packets from host 14 via a P2MP LSP consisting of MPLS enabled routers 42, 46, and 52.

As was the case with router 36 in FIG. 1, router 52 will receive copies of data from host 14 via both the shared and source distribution trees and the P2MP and P2P LSPs, respectively. To avoid receiving duplicate data, egress router 52 ideally would send a Prune control packet to core router 44 asking it to stop sending labeled (S1,G1) multicast data packets if core router 44 was PIM enabled. Core router 46, however is not PIM enabled, and would ignore the Prune control packet from egress router 52 if egress router 52 sent it the control packet. Ingress router 40, however, is PIM enabled and is a router on the shared distribution tree rooted at RP router 24. Egress router 52 can send the Prune control packet to ingress router 40 via an LSP. In response to receiving the Prune control packet from egress router 52, ingress router 40 could end transmission of (S1, G1) multicast data packets via the P2MP LSP described above, thereby effectively pruning off egress router 52 from the shared distribution tree rooted at RP router 24. Unfortunately, if ingress router 40 ends transmission of (S1, G1) multicast data packets via the P2MP LSP described above, receiver R1 would no longer receive (S2, G1) multicast packets via egress router 50 and the P2MP LSP. Thus, egress router 52 must continue to receive duplicate data from host 14 via the P2MP LSP created to emulate the shared distribution tree and via the P2MP LSP created to emulate the source distribution tree rooted at host 14.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Rather then using a P2MP LSP in a MPLS network for connecting multiple receivers on one side of the MPLS network to a shared distribution tree rooted at an RP on the other side of the MPLS network, the present invention contemplates building a P2P LSP between the ingress MPLS enabled router coupled directly or indirectly to the RP and each egress MPLS enabled router coupled directly or indirectly to a receiver that receives or seeks to receive multicast data packets from the RP. Stated in other words, rather then using a P2MP LSP to emulate a shared distribution tree in an MPLS network, the present invention contemplates using multiple P2P LSPs to emulate a shared distribution tree in an MPLS network.

Figure 1:
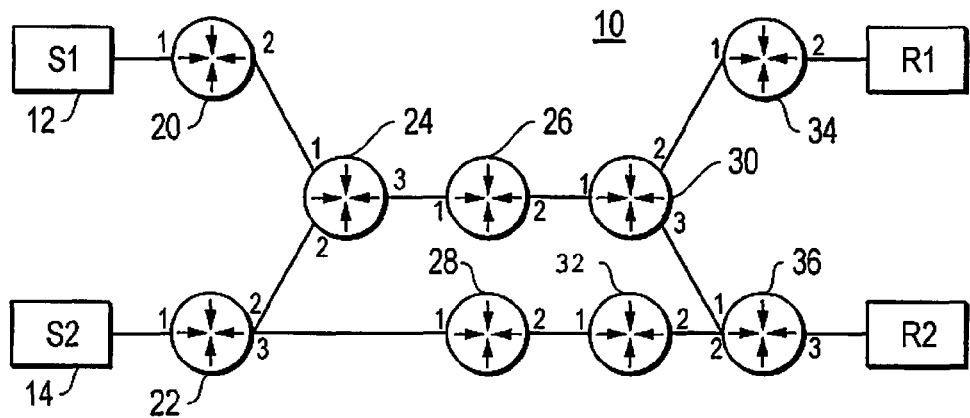
FIG. 1 is a block diagram illustrating relevant components of an exemplary network employing PIM-SM enabled routers.
Figure 2:
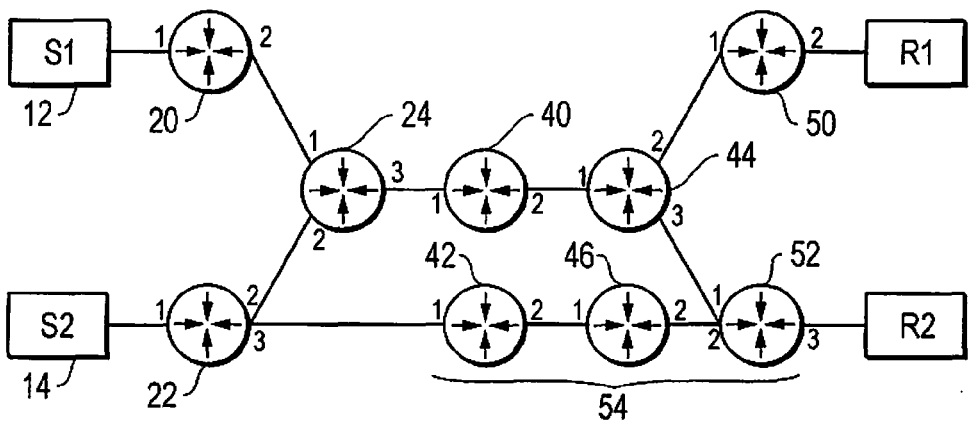
FIG. 2 is a block diagram illustrating relevant components of an exemplary network employing PIM-SM and MPLS enabled routers.
Figure 3:
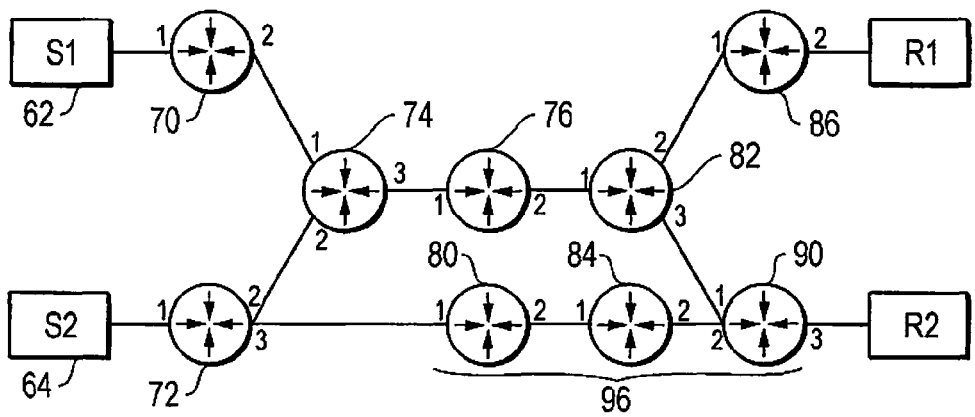
FIG. 3 is a block diagram illustrating relevant components of an exemplary network employing PIM-SM and MPLS enabled routers employing one embodiment of the present invention.

FIG. 3 illustrates a network employing one embodiment of the present invention, it being understood that the present invention should not be limited to the network shown in FIG. 3. Network 60 includes sources 62 and 64 coupled to receivers R1 and R2 via routers 70-90. Routers 70-74 are PIM-SM enabled only. Routers 76, 80, 86, and 90 are both PIM-SM and MPLS enabled. Lastly, routers 82 and 84 are MPLS enabled only. Routers 76-90 collectively form an MPLS network 96. Because routers 76 and 80 are PIM-SM enabled, routers 76 and 80 can communicate with routers PIM-SM enabled only 74 and 72, respectively. Routers 86 and 90 are likewise PIM-SM enabled and are capable of receiving IGMP membership reports from receivers R1 and R2, respectively. Routers 76, 80, 86 and 90 are considered edge routers within MPLS network 96. In the following description, a preferred embodiment of the present invention could be implemented as a software program executing on one or more nodes (e.g., MPLS enabled routers 76 or 80), although those skilled in the art will readily recognize that the equivalent of such software may also be constructed in hardware. If the invention is implemented as a computer program, the program may be stored in a conventional computer readable medium, that may include, for example: magnetic storage media such as a magnetic disk (e.g., a floppy disk or a disk drive) or magnetic tape; optical storage media such as an optical disk, optical tape, or machine readable bar code; solid state electronic storage devices such as random access memory (RAM) or read-only memory (ROM); or any other device or medium employed to store computer program instructions.

Router 74 acts as the RP for a multicast group identified by multicast IP address G. For the purposes of explanation only, only source 64 is transmitting multicast data packets to RP router 74 for subsequent distribution to receivers via a shared distribution tree rooted at the RP. Accordingly, RP router 74 is the root of a shared distribution tree for any host which has joined or is seeking to join multicast group G as a receiver. Edge router 76 is presumed to be a router on the shared distribution tree rooted at RP router 74.

Receiver R1 can join multicast group G by sending an IGMP membership report containing G to uplink router 86, which also happens to be an edge router of MPLS network 96. Router 86 creates an OIL for G, and adds interface 2, the interface that received the IGMP membership report from receiver R1. Edge router 86 then performs an RPF check using G. This RPF check identifies router 76 as the next PIM enabled hop towards RP router 74. Edge router 86 generates a (*, G) Join control packet, but cannot send the (*, G) Join control packet directly to edge router 76 since core router 82, the intervening router between edge routers 76 and 86, is not PIM enabled. As such, edge router 86 sends the (*, G) Join control packet to edge router 76 by attaching or adding a label to the (*, G) Join control packet, and then sending the labeled packet out of the interface coupled to the P2P LSP through which labeled packets can be transmitted from edge router 86 to edge router 76. Edge router 76, in response to receiving the (*, G) Join control packet from edge router 86, creates a first virtual interface for G to edge router 86, which will be more fully described below.

Receiver R2 also seeks to join the multicast group G after receiver R1. Accordingly, receiver R2 generates and transmits and IGMP membership report containing G to uplink router 90, which also happens to be an edge router of MPLS network 96. Router 90 creates an OIL for G, and adds interface 3, the interface that received the IGMP membership report from receiver R2. Edge router 90 also performs an RPF check using G. This RPF check identifies edge router 76 as the next PIM enabled hop towards RP router 74. Edge router 90 cannot send a (*, G) Join control packet directly to edge router 76 since core router 82, the intervening router between edge routers 76 and 90, is not PIM enabled. As such, edge router 90 sends a (*, G) Join control packet by first attaching or adding a label to the (*, G) Join control packet it generates. Then edge router 90 sends the labeled packet out of the interface coupled to the P2P LSP through which labeled packets can be transmitted from edge router 90 to edge router 76. Edge router 76, in response to receiving the (*, G) Join control packet from edge router 90, creates a second virtual interface for G to edge router 90.

The first virtual interface for G to edge router 86 links the multicast group IP address G to a first label corresponding to a first unidirectional P2P LSP through which labeled packets flow from edge router 76 to edge router 86. Likewise, the second virtual interface for G to edge router 90 links the multicast group IP address G to a second label corresponding to a second unidirectional P2P LSP through which labeled packets flow from from edge router 76 to edge router 86. The first and second unidirectional P2P LSPs are distinct. The first unidirectional P2P LSP includes MPLS enabled routers 76, 82 and 86, while the second unidirectional P2P LSP includes MPLS enabled routers 76, 82 and 90.

After creation of the first and second virtual interfaces within edge router 76, edge router 76 may receive a (S2, G) multicast data packet from RP router 74, where S2 is the IP address of source 64. In general, an ingress edge router such as edge router 76, identifies all of its virtual interfaces corresponding to the multicast group IP address contained in a multicast data packet it receives. Accordingly, in response to receiving the (S2, G) multicast data packet, edge router 76 identifies all of its virtual interfaces corresponding to the multicast group address G. In general, an ingress edge router such as edge router 76, replicates the multicast data packet it receives if the edge router has more than one virtual interface for the group IP address in the received multicast data packet. Edge router 76 has at least two virtual interfaces through which it will transmit the (S2, G) multicast data packet it receives from RP router 74. Accordingly, edge router 76 generates at least one replication of the (S2, G) multicast data packet. Edge router 76 then attaches or adds a first label L1 to (S2, G) multicast data packet received from RP router 74 to create a first labeled packet, wherein L1 corresponds to the first unidirectional P2P LSP. Edge router 76 also attaches or adds a second label L2 to the replication of the (S2, G) multicast data packet received from RP router 74 to create a second labeled packet, wherein L2 corresponds to the second unidirectional P2P LSP. Edge router 76 then forwards the first and second label packets out of the same interface (e.g., interface 2) coupled to the first and second unidirectional P2P LSPs, respectively. Edge routers 86 and 90, eventually receive the (S2, G) multicast data packets from edge router 76 via the first and second unidirectional P2P LSPs, respectively. Thereafter, edge routers 86 and 90 forward the (S2, G) multicast data packets to receivers R1 and R2, respectively, using conventional PIM-SM data packet forwarding techniques described above.

Router 90, after receiving the (S2, G) multicast data packet from RP router 74 via the second unidirectional P2P LSP, may seek to join the source distribution tree rooted at source 64. For purposes of explanation, it will be presumed that edge router 80 is a node on the source distribution tree rooted at source 64. Presuming edge router does join the source tree via a P2MP LSP in MPLS network 96, edge router 90 will receive multicast data packets from source 64 via the source distribution tree. Because edge router 90 is also receiving (S2, G) multicast packets from the RP router 74 via the second unidirectional P2P LSP, edge router 90 is receiving duplicate data from source 64. To avoid this, edge router 90 can generate a Prune control packet. Like the Join control packet described above, Edge router 90 cannot send a Prune control packet directly to edge router 76 since core router 82, the intervening router between edge routers 76 and 90, is not PIM enabled. As such, edge router 90 sends the Prune control packet by first attaching or adding a label to the Prune control packet it generates. Then edge router 90 sends the labeled packet out of the interface coupled to the P2P LSP through which labeled packets can be transmitted from edge router 90 to edge router 76. Edge router 76, in response to receiving the Prune control packet from edge router 90, nullifies the second virtual interface it has for G to edge router 90. Importantly, Edge router 76 does not nullify the first virtual interface is has for G to edge router 90. Edge router will not forward labeled packets to a nullified virtual interface. After nullifying the second virtual interface in response to receiving the Prune control packet, edge router 76 may receive additional (S2, G) multicast data packets from RP router 74. Assuming the first virtual interface described above is the only non-nullified virtual interface corresponding to G, ingress router 76 attaches or adds the first label L1 to (S2, G) multicast data packets received from RP router 74 to create labeled packets. These labeled packets are then transmitted out interface 2 coupled to the first unidirectional P2P LSP. Egress router 86 eventually receives the (S2, G) multicast data packets from edge router 76 via the first unidirectional P2P LSP. Since the second virtual interface was nullified in ingress router 76, however, egress router 90 will no longer receive (S2, G) multicast data packets from ingress router 76 via the second unidirectional P2P LSP.

In an alternative embodiment, the present invention could avoid the problems described in the background section above by creating a MP2MP LSP within network 96 between edge routers 76, 86, and 90, and create a virtual multi-access network between them. PIM-SM protocol could be implemented on the virtual network as if the virtual network was an Ethernet network. The (S2, G) multicast data packets received by edge router 76 from RP router 74 are forwarded by edge router 76 onto the virtual multi-access network. Multicast data packets received from the source distribution tree rooted at source 64, can still be transmitted to egress router 90 via the unidirectional P2MP or P2P LSP that consists of routers 80, 84, and 90. Because the (S2, G) multicast data packets received by edge router 76 from RP are forwarded on the virtual multi-access network via the MP2MP LSP (or multiple MP2MPLSPs), ingress router 76 need not replicate the received (S2, G) multicast data packets for egress routers 86 and 90 to receive the (S2, G) multicast data packets. All sparse mode operations (e.g., egress router 90 pruning itself from receiving (S2, G) multicast data packets via the shared distribution tree rooted at RP router 74) can be done on the multi-access network between edge routers 76, 86, and 90. However, before ingress router 76 stops forwarding (S2, G) multicast data packets to egress router 86 via the MP2MP enabled multi-access network, ingress router 76 must receive Prunes for G from both egress routers 86 and 90.

Figure 4:
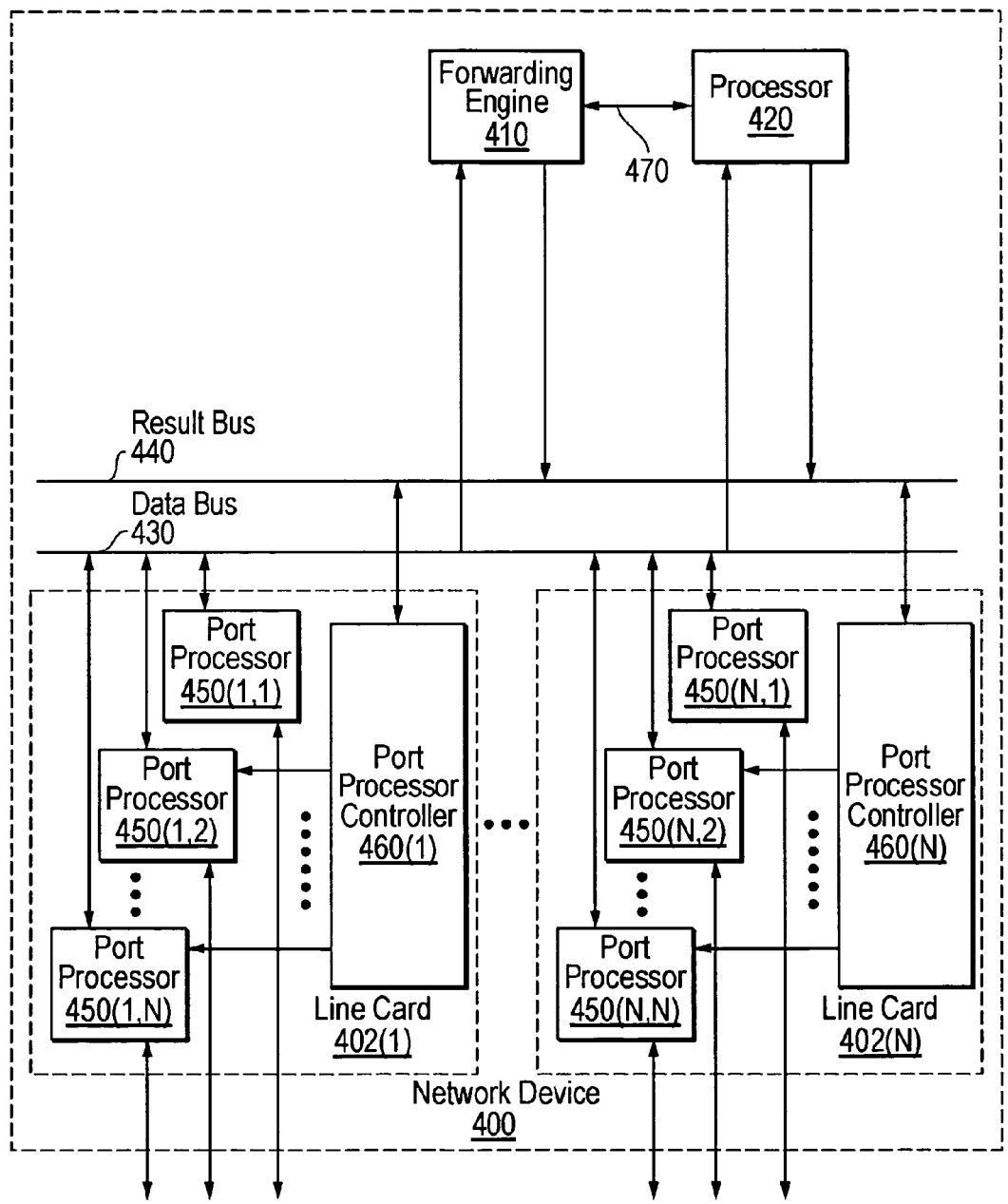
FIG. 4 is a block diagram illustrating an example of a network appropriate for implementing embodiments of the present invention.

FIG. 4 is a simplified block diagram illustrating an example of a network routing appropriate for implementing embodiments of the present invention. In this depiction, network routing device 400 includes a number of line cards (line cards 402(1)-(N)) that are communicatively coupled to a forwarding engine 410 and a processor 420 via a data bus 430 and a result bus 440. Line cards 402(1)-(N) include a number of port processors 450(1,1)-(N,N) which are controlled by port processor controllers 460(1)-(N). It will also be noted that forwarding engine 410 and processor 420 are not only coupled to one another via data bus 430 and result bus 440, but are also communicatively coupled to one another by a communications link 470.

When a packet is received, the packet is identified and analyzed by a network device such as network routing device 400 in the following manner, according to embodiments of the present invention. Upon receipt, a packet (or some or all of its control information) is sent from the one of port processors 450(1,1)-(N,N) at which the packet was received to one or more of those devices coupled to data bus 430 (e.g., others of port processors 450(1,1)-(N,N), forwarding engine 410 and/or processor 420). Handling of the packet can be determined, for example, by forwarding engine 410. For example, forwarding engine 410 may determine that the packet should be forwarded to one or more of port processors 450(1,1)-(N,N). This can be accomplished by indicating to corresponding one(s) of port processor controllers 460(1)-(N) that the copy of the packet held in the given one(s) of port processors 450(1,1)-(N,N) should be forwarded to the appropriate one of port processors 450(1,1)-(N,N).

In the foregoing process, network security information can be included in a frame sourced by network routing device 400 in a number of ways. For example, forwarding engine 410 can be used to detect the need for the inclusion of network security information in the packet, and processor 420 can be called into service to provide the requisite network security information. This network security information can be included in the packet during the transfer of the packet's contents from one of port processors 450(1,1)-(N,N) to another of port processors 450(1,1)-(N,N), by processor 420 providing the requisite information directly, or via forwarding engine 410, for example. The assembled packet at the receiving one of port processors 450(1,1)-(N,N) can thus be made to contain the requisite network security information.

In addition, or alternatively, once a packet has been identified for processing according to the present invention, forwarding engine 410, processor 420 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a second router receiving a multicast data packet from a first rendezvous point (RP) router, wherein the RP router is a root of a first shared distribution tree for distributing the multicast data packet;
   the second router transmitting a first label-switched packet to a third router via a first point-to-point label switched path (LSP), wherein the second router transmits the first label-switched packet via a port of the second router, wherein the first label-switched packet comprises a first label corresponding to the first point-to-point LSP, and wherein the first label-switched packet comprises the multicast data packet;
   the second router replicating the multicast data packet to produce a replicated multicast data packet;
   the second router transmitting a second label-switched packet to a fourth router via a second point-to-point LSP, wherein the second router transmits the second label-switched packet via the port of the second router, wherein the second label-switched packet comprises a second label corresponding to the second point-to-point LSP, and wherein the second label-switched packet comprises the replicated multicast data packet;
   wherein the first point-to-point LSP is distinct from the second point-to-point LSP, and wherein the first and second labels are distinct from each other.

2. The method of claim 1 further comprising:
   receiving at the second router a first control packet and a second control packet from the third and fourth routers, respectively, wherein the second router transmits the first and second label-switch packets after the second router receives the first and second control packets;
   wherein the first control packet comprises a multicast group IP address and a rendezvous point IP address for the first RP router;
   wherein the second control packet comprises the multicast group IP address and the rendezvous point IP address for the first RP router.

3. The method of claim 2 further comprising:
   receiving at the second router another multicast data packet, wherein the other multicast data packet comprises the IP address of the source; and
   transmitting at the second router the other multicast data packet or a replication thereof to the fourth router via the second point-to-point LSP without the second router transmitting the other multicast data packet or the replication thereof to the third router via the first point-to-point LSP.

4. The method of claim 3 further comprising receiving at the third router a stream of multicast data packets via an LSP after the second router receives the control packet directly or indirectly from the first router, wherein each of the multicast data packets of the stream comprises the IP address of the source.

5. The method of claim 2 further comprising:
   creating at the second router a first virtual interface to the third router in response to the second router receiving the first control packet;
   creating at the second router a second virtual interface to the fourth router in response to the second router receiving the second control packet.

6. The method of claim 1 further comprising:
   receiving at the third router the multicast data packet, wherein the multicast data packet comprises an IP address for a source;
   receiving at the second router a control packet sent directly or indirectly from the third router, wherein
      the control packet is sent directly or indirectly from the third router in response at least in part to the receiving the multicast data packet at the third router.

7. A first router comprising:
   a port;
   a memory for storing a set of executable instructions;
   a processor coupled to the memory, wherein the processor is configured to implement a method if the processor executes the set of executable instructions, wherein the method comprises:
      replicating a multicast data packet in response to the first router receiving the multicast data packet from a second RP router that is a root of a first shared distribution tree for distributing the multicast data packet;
      generating a first label-switched packet, wherein the first label-switched packet comprises the multicast packet, and a first label, wherein the first label corresponds to a first point-to-point label-switched path (LSP);
      generating a second label-switched packet, wherein the second label-switched packet comprises the replicated multicast packet and a second label, wherein the second label corresponds to a second point-to-point LSP;
      transmitting the first label-switched packet toward a third router via the port and the first point-to-point LSP;
      transmitting the second label-switched packet toward a fourth router via the port and the second point-to-point LSP;
      wherein the first label is distinct from the second label.

8. The first router of claim 7:
   wherein the first and second label-switched packets are generated after the first router receives a first control packet and a second control packet from third and fourth routers, respectively;

wherein the first control packet comprises a multicast group IP address and a rendezvous point IP address;
wherein the second control packet comprises the multicast group IP address and the rendezvous point IP address.

9. The first router of claim 8, wherein the method further comprises:
receiving at the first router another multicast data packet, wherein the other multicast data packet comprises the IP address of the source; and
transmitting at the first router the other multicast data packet or a replication thereof to the fourth router via the second point-to-point LSP without the first router transmitting the other multicast data packet or the replication thereof to the third router via the first point-to-point LSP.

10. The first router of claim 7 wherein the method further comprises:
receiving at the first router a control packet sent directly or indirectly from the third router, wherein the control packet is sent directly or indirectly from the third router in response at least in part to the third router receiving the first label-switched packet.

11. A network comprising:
a first router coupled to third and fourth routers, wherein the first router further comprises
a port;
a data packet replication circuit configured to replicate a multicast packet in response to the first router receiving the multicast data packet from a second RP router that is a root of a first distribution tree for distributing the multicast packet;
a first circuit for generating a first label-switched packet, wherein the first label-switched packet comprises the multicast packet, and a first label, wherein the first label corresponds to a first point-to-point label-switched path (LSP) coupled between the first router and the third router;
a second circuit for generating a second label-switched packet, wherein the second label-switched packet comprises the replicated multicast packet and a second label, wherein the second label corresponds to a second point-to-point LSP coupled between the first router and the fourth router;
a third circuit for transmitting the first label-switched packet toward the third router via the port and the first point-to-point LSP;
a fourth circuit for transmitting the second label-switched packet toward a fourth router via the port and the first point-to-point LSP;
wherein the first label is distinct from the second label.

12. The network of claim 11:
wherein the third router comprises a circuit for generating a first protocol independent multicast (PIM) Join control packet, wherein the first PIM Join control packet comprises a multicast group IP address and a rendezvous point IP address;
wherein the third router is configured to transmit the first PIM Join control packet to the first router;
wherein the fourth router comprises a circuit for generating a second PIM Join control packet, wherein the second PIM Join control packet comprises the multicast group IP address and the rendezvous point IP address;
wherein the fourth router is configured to transmit the second PIM Join control packet to the first router.

13. The network of claim 11 further comprising:
a fifth circuit for receiving at the first router a control packet sent directly or indirectly from the third router, wherein the control packet is sent directly or indirectly from the third router in response at least in part to the third router receiving the first label-switched packet.

14. An apparatus comprising:
a port;
means for replicating a multicast data packet in response to receiving the multicast data packet from an RP router that is a root of a first distribution tree for distributing the multicast data packet;
means for generating a first label-switched packet, wherein the first label-switched packet comprises the multicast packet, and a first label, wherein the first label corresponds to a first point-to-point label-switched path (LSP);
means for generating a second label-switched packet, wherein the second label-switched packet comprises the replicated multicast packet and a second label, wherein the second label corresponds to a second point-to-point LSP;
means for transmitting the first label-switched packet toward a third router via the port and the first point-to-point LSP;
means for transmitting the second label-switched packet toward a fourth router via the port and the first point-to-point LSP;
wherein the first label is distinct from the second label.

* * * * *